US012639649B2

(12) United States Patent
Nagaraja

(10) Patent No.: US 12,639,649 B2
(45) Date of Patent: May 26, 2026

(54) SYSTEMS AND METHODS FOR ESTIMATION OF WORKFLOW EXECUTION TIME

(71) Applicant: The Toronto-Dominion Bank, Toronto (CA)

(72) Inventor: Sanjay Nagaraja, Woodbridge, NJ (US)

(73) Assignee: THE TORONTO-DOMINION BANK, Toronto (CA)

( * ) Notice: Subject to any disclaimer, the term of this patent is extended or adjusted under 35 U.S.C. 154(b) by 644 days.

(21) Appl. No.: 18/102,235

(22) Filed: Jan. 27, 2023

(65) Prior Publication Data

US 2024/0256335 A1     Aug. 1, 2024

(51) Int. Cl.
| | |
|---|---|
| *G06Q 10/0633* | (2023.01) |
| *G06F 9/48* | (2006.01) |
| *G06F 11/34* | (2006.01) |
| *G06Q 10/0631* | (2023.01) |
| *B01F 21/00* | (2022.01) |
| *G06Q 10/10* | (2023.01) |

(52) U.S. Cl.
CPC ....... *G06Q 10/0633* (2013.01); *G06F 9/4887* (2013.01); *G06F 11/3419* (2013.01); *G06Q 10/06312* (2013.01); *B01F 21/30* (2022.01); *G05B 2219/31449* (2013.01); *G06Q 10/103* (2013.01)

(58) Field of Classification Search
CPC ............. G06Q 10/103; G06Q 10/0633; G06Q 10/06312; B01F 21/30; G05B 2219/31449; G06F 9/4887; G06F 11/3419
See application file for complete search history.

(56) References Cited

U.S. PATENT DOCUMENTS

| | | | | |
|---|---|---|---|---|
| 6,115,640 | A * | 9/2000 | Tarumi | G06Q 10/10 |
| | | | | 700/99 |
| 8,510,751 | B2 * | 8/2013 | Saha | G06F 9/5038 |
| | | | | 719/313 |
| 8,806,490 | B1 * | 8/2014 | Pulsipher | G06Q 10/10 |
| | | | | 718/100 |
| 9,223,628 | B2 | 12/2015 | Rastogi | |
| 10,936,367 | B2 | 3/2021 | Curino | |
| 11,315,060 | B2 * | 4/2022 | Agarwal | G06Q 10/0633 |
| 11,461,669 | B2 | 10/2022 | Von Trapp | |
| 12,118,487 | B2 * | 10/2024 | Chen | G06Q 10/0633 |
| 12,169,802 | B1 * | 12/2024 | Eldan | G06F 40/186 |
| 2002/0188597 | A1 * | 12/2002 | Kern | G06Q 30/06 |
| 2005/0149908 | A1 * | 7/2005 | Klianev | G06F 8/34 |
| | | | | 717/109 |
| 2006/0224432 | A1 * | 10/2006 | Li | G06Q 10/1093 |
| | | | | 705/7.19 |
| 2007/0055558 | A1 * | 3/2007 | Shanahan | G06Q 10/06 |
| | | | | 705/7.26 |
| 2007/0162324 | A1 * | 7/2007 | Suzuki | G06Q 10/06 |
| | | | | 705/7.26 |

(Continued)

*Primary Examiner* — Patrick F Riegler
(74) *Attorney, Agent, or Firm* — NIXON PEABODY LLP

(57) ABSTRACT

Computer-implemented systems and methods for estimating workflow execution time of a plurality of jobs executed on one or more servers. The system includes a monitoring computer that identifies the plurality of jobs and determines a depth and rank to assign to each job and thereby identify the workflow each job belongs to, along with the sequencing of the job within the workflow.

19 Claims, 4 Drawing Sheets

(56)           References Cited

U.S. PATENT DOCUMENTS

| 2008/0065448 | A1* | 3/2008 | Hull | G06Q 10/06 |
| | | | | 705/7.26 |
| 2011/0231849 | A1* | 9/2011 | Saha | G06F 9/5038 |
| | | | | 711/E12.017 |
| 2012/0167101 | A1* | 6/2012 | Kandula | G06F 9/5038 |
| | | | | 718/102 |
| 2013/0347001 | A1* | 12/2013 | Furukawa | G06F 9/526 |
| | | | | 718/106 |
| 2016/0328264 | A1* | 11/2016 | Sparapani | G06F 8/65 |
| 2019/0205792 | A1* | 7/2019 | Huang | G06F 9/4881 |
| 2019/0213040 | A1* | 7/2019 | Ohba | G06F 9/526 |
| 2019/0347168 | A1* | 11/2019 | Giannetti | G06F 11/1438 |
| 2020/0097324 | A1* | 3/2020 | Teh | G06F 9/5066 |
| 2020/0125448 | A1 | 4/2020 | Von Trapp | |
| 2020/0125962 | A1 | 4/2020 | Von Trapp | |
| 2023/0102750 | A1* | 3/2023 | Parietti | G05B 19/41865 |
| | | | | 700/100 |
| 2023/0259839 | A1* | 8/2023 | Manalo | G06Q 10/063114 |
| | | | | 705/7.13 |
| 2024/0220895 | A1* | 7/2024 | St Pierre | G06Q 10/06316 |
| 2025/0130556 | A1* | 4/2025 | Zhou | G05B 19/41865 |

* cited by examiner

SYSTEMS AND METHODS FOR ESTIMATION OF WORKFLOW EXECUTION TIME

TECHNICAL FIELD

The disclosed exemplary embodiments relate to computer-implemented systems and methods for processing workflows and, in particular, to systems and methods for estimation and forecasting of execution time of interdependent workflows.

BACKGROUND

Many organizations possess and maintain confidential data regarding their operations. For instance, some organizations may have confidential data concerning industrial formulas and processes. Other organizations may have confidential data concerning customers and their interactions with those customers. In a large organization, this confidential data may be stored in a variety of databases, which may have different, sometimes incompatible schemas, fields and compositions. A sufficiently large organization may have hundreds of millions of records across these various databases, corresponding to tens of thousands, hundreds of thousands or even millions of customers. This quantity and scope of confidential data represents a highly desirable source of data to be used as input into machine learning models that can be trained, e.g., to predict future occurrences of events, such as customer interactions or non-interactions. With such large volumes of data, it may be desirable to use the computational resources available in distributed or cloud-based computing systems.

SUMMARY

The following summary is intended to introduce the reader to various aspects of the detailed description, but not to define or delimit any invention.

In at least one broad aspect, there is provided a system for estimating workflow execution time, the system comprising: one or more servers, each of the servers comprising a server processor configured to execute one or more of a plurality of jobs; a monitoring computer, the monitoring computer comprising a processor operatively coupled to a memory and a display, the processor configured to: identify the plurality of jobs; label the plurality of jobs according to a depth and a rank, wherein for each job, a respective depth identifies a workflow to which the job belongs, and a respective rank identifies sequencing of the job within the workflow to which the job belongs; and display each of the plurality of jobs in a corresponding plurality of rows on the display, wherein the plurality of jobs are assigned to rows based on their depth and rank.

In some cases, each job is labelled with a respective level, wherein the level provides an indication of a relative order within the respective rank of the job, and wherein the plurality of jobs is further assigned to rows based on their level.

In some cases, a child job has a dependency on a respective parent job, and the child job has a link to the respective parent job, wherein the link comprises a visual indicator of the dependency.

In some cases, the rank is denoted by an integer number. In some cases, a job of the plurality of jobs with a respective rank that has a lower number than a second job of the plurality of jobs with a respective rank that has a higher number is executed before the second job of the plurality of jobs.

In some cases, the level determines that in a portion of the plurality of jobs, for each job having a same respective rank and having a same prior job but are not interdependent, are to be executed in parallel.

In some cases, the depth is denoted by an integer number.

In some cases, a second workflow with a respective depth that has a higher number than a first workflow with a respective depth that has a lower number is a sub-workflow of the first workflow.

In some cases, each job of the plurality of jobs has a job start time, a job end time, and a job duration, In another broad aspect, there is provided a method for estimating workflow execution time, the method comprising: labelling a plurality of jobs according to a depth and a rank, wherein for each job, a respective depth identifies a workflow to which the job belongs, and a respective rank identifies sequencing of the job within the workflow to which the job belongs; and displaying each of the plurality of jobs in a corresponding plurality of rows on a display, wherein the plurality of jobs are assigned to rows based on their depth and rank.

In some cases, the method further comprises, for each job, labelling a respective level of the job, wherein the level provides an indication of a relative order within the respective rank of the job, and wherein the plurality of jobs is further assigned to rows based on their level.

In some cases, the method further comprises, determining a dependency of a child job on a parent job; and linking the child job to the parent job, wherein the linking comprises displaying a visual indicator of the dependency.

In some cases, the rank is denoted by an integer number.

In some cases, a job of the plurality of jobs with a respective rank that has a lower number than a second job of the plurality of jobs with a respective rank that has a higher number is executed before the second job of the plurality of jobs.

In some cases, the level determines that a portion of the plurality of jobs, each job having a same respective rank and that are linked to a same prior job, but are not interdependent are to be executed in parallel.

In some cases, the depth is denoted by an integer number.

In some cases, a second workflow with a respective depth that has a higher number than a first workflow with a respective depth that has a lower number is a sub-workflow of the first workflow.

In some cases, the method further comprises providing a job start time, a job end time, and a job duration for each of the plurality of jobs.

According to some aspects, the present disclosure provides a non-transitory computer-readable medium storing computer-executable instructions. The computer-executable instructions, when executed, configure a processor to perform any of the methods described herein.

BRIEF DESCRIPTION OF THE DRAWINGS

The drawings included herewith are for illustrating various examples of articles, methods, and systems of the present specification and are not intended to limit the scope of what is taught in any way. In the drawings.

DETAILED DESCRIPTION

Figure 1:
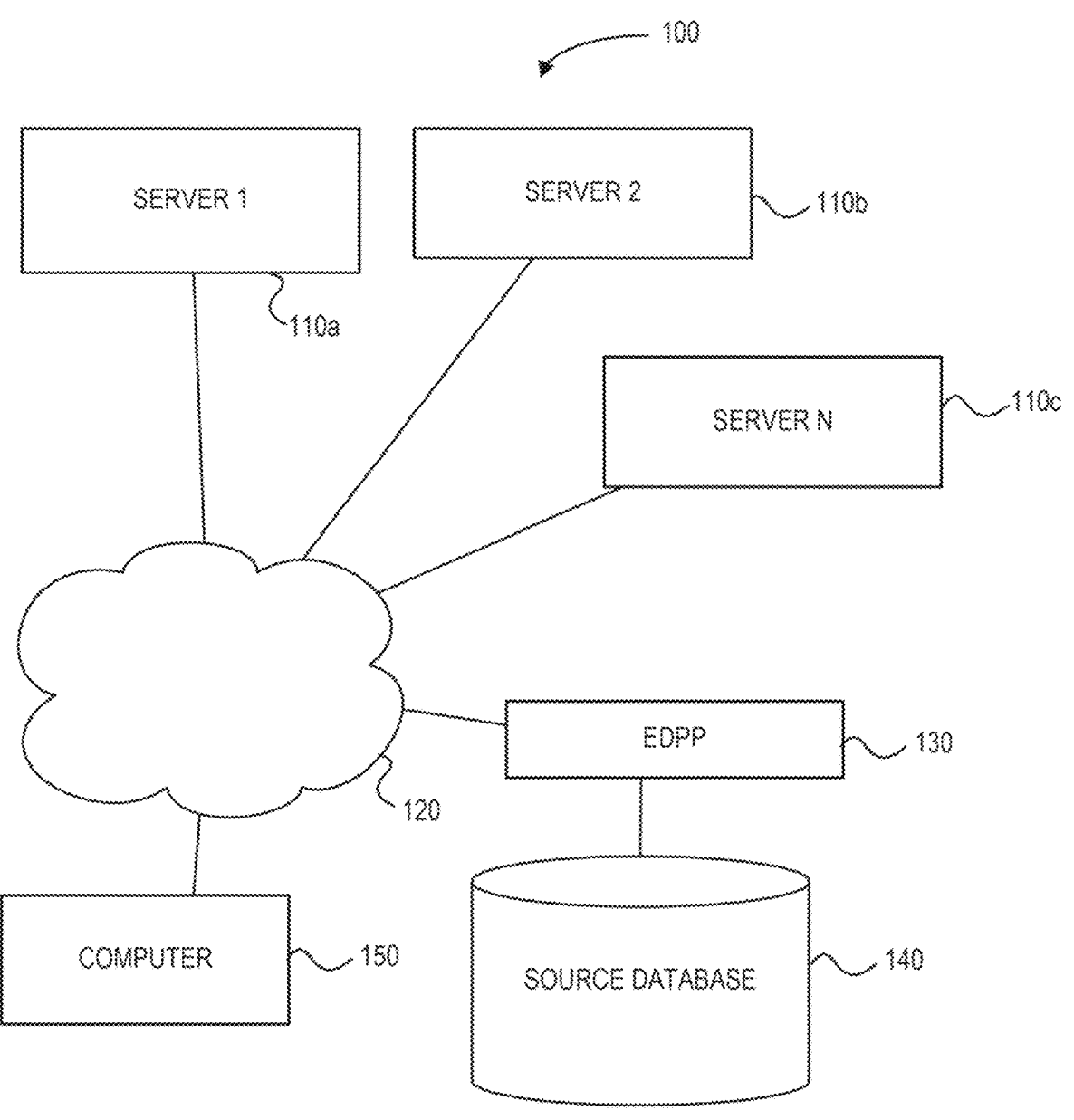
FIG. 1 is a schematic block diagram of an exemplary system for estimating workflow execution time in accordance with at least some embodiments.

As noted above, many organizations possess and maintain confidential data regarding their operations. For instance, some organizations may have confidential data concerning industrial formulas and processes. Other organizations may have confidential data concerning customers and their inter-actions with those customers. In a large organization, this confidential data may be stored in a variety of databases, which may have different, sometimes incompatible sche-mas, fields and compositions. A sufficiently large organiza-tion may have hundreds of millions of records across these various databases, corresponding to tens of thousands, hun-dreds of thousands or even millions of customers.

An organization may implement workflows for execution that manage, process, and report data, among other tasks. In certain settings, there may be a desire to execute complex workflows on a regular, periodic basis (e.g., daily or even hourly). The workflow execution jobs may have complex interdependencies and execution paths. For instance, a first workflow job may be executed by a first server, a second workflow job may be executed by a second server, and a third workflow job—which depends on the output of the first and second workflow jobs—may be executed by a third server, in which case the third server must wait for the first and second workflow jobs to complete before the third workflow job can begin. Moreover, each of the servers and workflow jobs may be implemented in different technologies or platforms (e.g., AxiomSL ControllerView™ workflows, Autosys™ jobs, Oracle Batch or Run Rule Framework or Process Modeller, cron jobs, scripted batch jobs, etc.).

Interrelationships between workflow jobs may be even more complicated than the above example. The workflow jobs may include very large numbers of individual jobs all linked together with numerous branches, conditional logic/execution, nested workflows, recursive executions, and multi-dimensional dependencies.

Forecasting and estimating completion times, or finding the most critical path for completion, or performing impact analysis when a workflow job fails to complete, has previ-ously required manual involvement.

The described embodiments provide systems and meth-ods to capture workflow jobs in a comprehensive manner that allows for forecasting and estimation of completion times, to determine the most critical path for completion, and to perform impact analysis when a job breaks and is restarted after a period of time has elapsed (e.g., following issue resolution).

In at least some embodiments, workflow jobs are assigned unique identifiers which determine the workflow hierarchy and dependencies. The unique identifiers comprise a rank, a level, and a depth. When considering the workflow visually as shown, e.g., in FIG. 3, depth increases from top to bottom, rank increases from left to right, and levels increase from top to bottom.

The depth applies to "pages" that may be stacked, where a first page may refer, for example, to a main workflow, and a second page may refer to a sub-workflow of the main workflow. A downstream sub-workflow is generally shown below the main upstream workflow that initiates the sub-workflow.

The rank illustrates the order of execution within a workflow. A first job, for example, with a rank to the left of a second job is executed before the second job, when the two jobs are linked together (e.g., the second job is dependent on the completion of the first job).

The level within a workflow can be used to illustrate workflow jobs that have a common rank but are not inter-dependent, and may execute in parallel when linked to the same preceding job.

The described embodiments generally provide for a com-puter-implemented approach for determining the workflow, and forecasting the completion time. The approach may be implemented using frameworks such as Microsoft Project™ or similar, wherein each workflow job is assigned a unique identifier as part of a consistent naming convention. The naming convention facilitates the orderly arrangement of representations of each workflow job in a visualization on a display. The described approach is scalable, extensible, and allows for exporting in multiple document formats.

Referring now to FIG. 1, there is illustrated a block diagram of an example computing system, in accordance with at least some embodiments. Computing system 100 has a plurality of servers including a first server 110*a*, a second server 110*b*, and an N$^{th}$ server 110*c* operatively coupled to a cloud-based computer 120, an enterprise data provisioning platform (EDPP) 130 operatively coupled to cloud-based computer 120, a source database 140 operatively coupled to the EDPP 130, and an end node or computer 150 also operatively coupled to the cloud-based computer 120.

Various workflow jobs may be executed on the different servers 110*a*, 110*b*, 110*c*, which may involve extracting data from the source database 140 via the EDPP 130. The workflow may be initiated by a user at the computer 150, similarly the estimate of the workflow's completion may be outputted to, and viewed on a display of, the computer 150. The workflow may also be initiated by the cloud-based computer 120 or the EDPP 130. While a first server 110*a*, a second server 110*b*, and an N$^{th}$ server 110*c* are described, a workflow may comprise the jobs that are executed on any number of servers, and any number of servers may be operatively coupled to the cloud-based computer 120, and any number of jobs may require extracting data from the source database 140 via the EDPP 130. Similarly, there may be multiple source databases operatively coupled to the EDPP 130.

Figure 2:
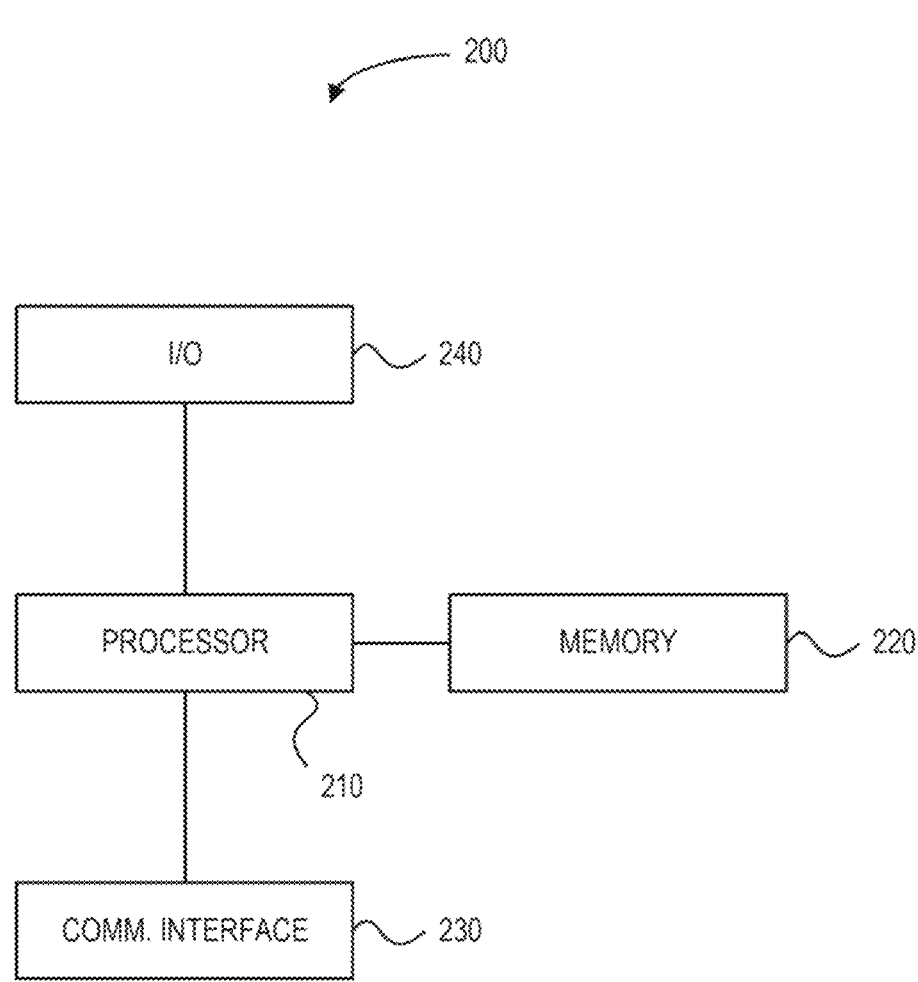
FIG. 2 is a block diagram of a computer in accordance with at least some embodiments.

Referring now to FIG. 2, there is illustrated a simplified block diagram of a computer in accordance with at least some embodiments. Computer 200 is an example imple-mentation of a computer such as the servers 110*a*, 110*b*, 110*c*, EDPP 130, cloud-based computer 120, and end node computer 150. Computer 200 has at least one processor 210 operatively coupled to at least one memory 220, at least one communications interface 230, at least one input/output device 240.

The at least one memory 220 includes a volatile memory that stores instructions executed or executable by processor 210, and input and output data used or generated during execution of the instructions. Memory 220 may also include non-volatile memory used to store input and/or output data—e.g., within a database—along with program code containing executable instructions.

Processor 210 may transmit or receive data via communications interface 230, and may also transmit or receive data via any additional input/output device 240 as appropriate.

In some implementations, computer 200 may be batch processing system that is generally designed and optimized to run a large volume of operations at once, and are typically used to perform high-volume, repetitive tasks that do not require real-time interactive input or output. Conversely, some implementations of computer 200 may be interactive systems that accept input (e.g., commands and data) and produce output in real-time. In contrast to batch processing systems, interactive systems generally are designed and optimized to perform small, discrete tasks as quickly as possible, although in some cases they may also be tasked with performing long-running computations similar to batch processing tasks.

Figure 3:
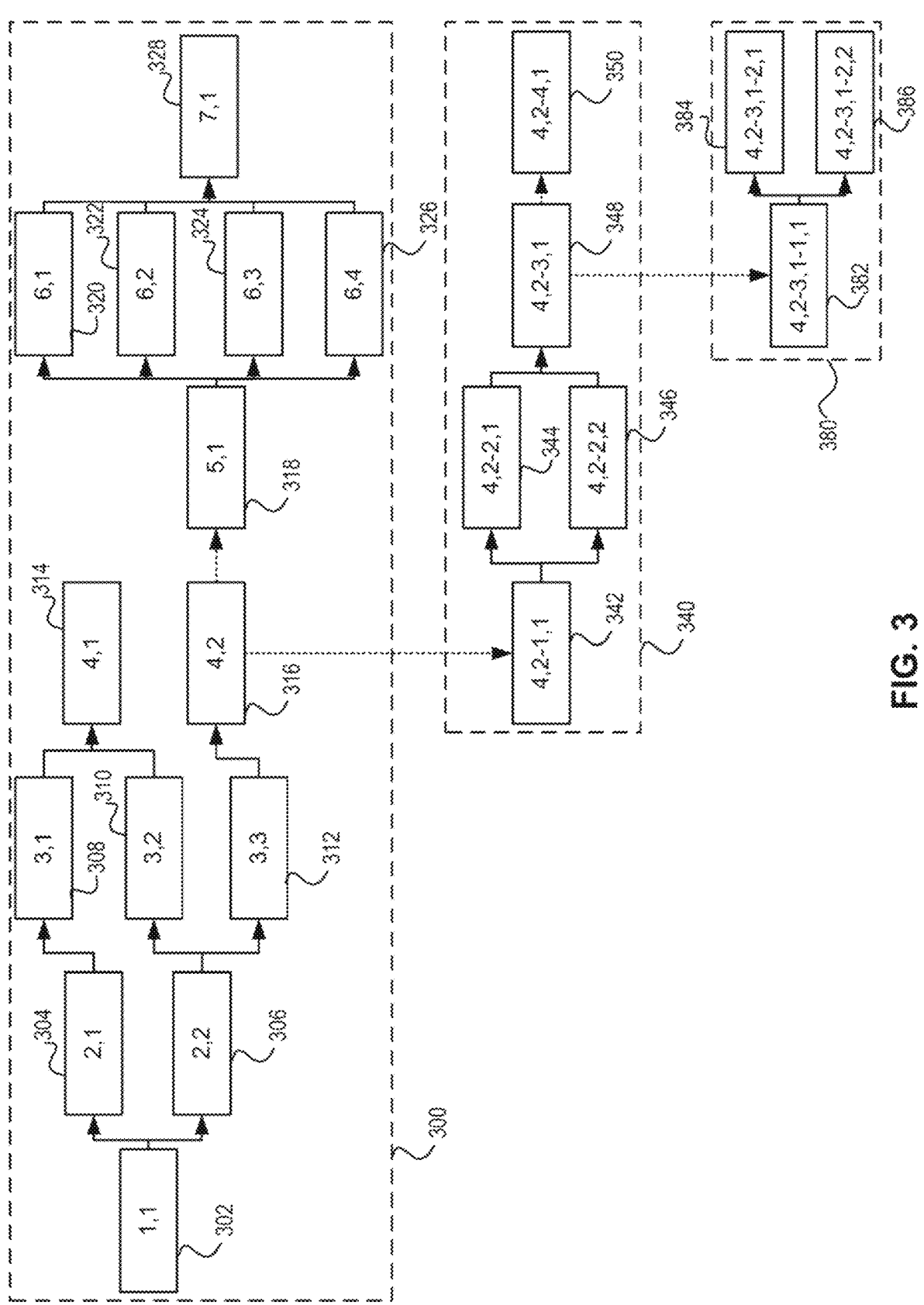
FIG. 3 is a block diagram of an example workflow for execution by the system of FIG. 1.

Referring now to FIG. 3, there is illustrated block diagram of an example workflow for execution by the system of FIG. 1.

Workflow 300 contains a number of workflow jobs 302 to 328. Workflow 300 is the highest-level, main workflow, and is assigned a depth of 1. The workflow jobs 302 to 328 within workflow 300 are arranged in a visual sequence that progresses from left to right, each with a unique identifier. The workflow job 302 is the topmost and leftmost job, signifying that it is the start of the workflow sequence of jobs. Workflow job 302 is assigned a rank and a level corresponding to the naming convention format "Rank, Level", forming the unique identifier. Workflow job 302 has a rank of 1 and a depth of 1, and is therefore identified as "1,1".

Workflow jobs 304 and 306 are executed once workflow job 302 is complete. They are assigned a rank of 2, signifying that they are to be executed after completion of the preceding workflow job. Workflow job 304 is assigned a level of 1 and workflow job 306 is assigned a level of 2. This signifies that workflow jobs 304 and 306 may be executed in parallel as they are not interdependent.

On completion of workflow job 304, workflow job 308 may be executed. Workflow job 308 is assigned a rank of 3 and a level of 1. Similarly, on completion of workflow job 306, workflow jobs 310 and 312 may be executed. Workflow jobs 310 and 312 are both assigned a rank of 3, and a level of 2 and 3 respectively. Workflow jobs 308, 310 and 312 may executed in parallel as they are not interdependent.

Workflow job 314 is dependent on the completion of both workflow jobs 308 and 310. Workflow job 314 is assigned a rank of 4 and a level of 1. Workflow job 316 is dependent on the completion of workflow job 312 and is assigned a rank of 4 and a level of 2. The execution of workflow jobs 314 and 316 may be performed in parallel as workflow jobs 314 and 316 are not interdependent. Workflow job 316 comprises sub-workflow 340 that is to be completed before the following workflow job 318 is executed.

Workflow job 318 is dependent on the completion of workflow job 316 and is assigned a rank of 5 and a level of 1. Workflow jobs 320, 322, 324, and 326 are dependent on the completion of workflow job 318. They are each assigned a rank of 6 and a level of 1, 2, 3, and 4 respectively. They may be executed in parallel as they are not interdependent and rely only on the preceding workflow job 318.

On completion of workflow jobs 320, 322, 324, and 326, workflow job 328 may be executed. Workflow job 328 is assigned a rank of 7, and is the last workflow job to be executed, and is assigned a level of 1.

Workflow job 316 contains sub-workflow 340. Similar to workflow 300, the workflow job that is the topmost and leftmost in the sub-workflow 340 signifies the start of the sub-workflow 340 sequence. Sub-workflow job 342 is the topmost and leftmost sub-workflow job in the sub-workflow 340. Nested workflows conform to the naming convention format "Parent Object ID-Current Object ID", with the Parent Object ID and the Current Object ID having the format of "Rank, Level". Sub-workflow job 342 has a Parent Object ID of "4,2" (the rank and level of workflow job 316) and a Current Object ID of "1, 1" signifying that it has a rank of 1 and a level of 1 within the sub-workflow 340. Every sub-workflow job within sub-workflow 340 has a Parent Object ID of "4,2".

On completion of sub-workflow job 342, sub-workflow jobs 344 and 346 are executed. Sub-workflow jobs 344 and 346 are assigned a Current Object ID of "2,1" and "2,2" respectively. Sub-workflow jobs 344 and 346 may be executed in parallel as they are not interdependent.

Sub-workflow job 348 is dependent on the completion of both sub-workflow jobs 344 and 346. Sub-workflow job 348 is assigned a Current Object ID of "3,1". Sub-workflow job 348 contains sub-workflow 380 that is to be completed before the following workflow job 350 may be executed.

On completion of sub-workflow job 348, the final sub-workflow job 350 may be executed. Sub-workflow job 350 is assigned a Current Object ID of "4,1". On completion of the workflow jobs 342-350 within sub-workflow 340, workflow job 318 may be executed.

Sub-workflow job 348 contains sub-workflow 380. Similar to sub-workflow 348, the workflow job that is the topmost and leftmost in the sub-workflow 380 signifies the start of the sub-workflow 380 sequence. Sub-workflow job 382 is the topmost and leftmost sub-workflow job in the sub-workflow 380. The nested workflow conforms to the naming convention format "Parent Object ID-Current Object ID", with the Parent Object ID and the Current Object ID having the format of "Rank, Level". Sub-workflow job 382 has a Parent Object ID of "4,2-3,1" (the rank and level of workflow job 316, followed by the rank and level of sub-workflow job 348) and a Current Object ID of "1,1" signifying that it has a rank of 1 and a level of 1 within the sub-workflow 380. Every sub-workflow job within sub-workflow 380 has a Parent Object ID of "4,2-3,1".

On completion of sub-workflow job 382, sub-workflow jobs 384 and 386 may be executed. They are assigned a Current Object ID of "2,1" and "2,2" respectively. Sub-workflow jobs 384 and 386 may be executed in parallel as they are not interdependent. On completion of the workflow jobs 382 to 386 within sub-workflow 380, sub-workflow job 350 may be executed.

Although the workflow structure of FIG. 3 is based on the convention that the topmost and leftmost element is executed first, other conventions may also be used with the appropriate adjustments. For instance, the convention could be that the leftmost and bottommost element is executed first, with subsequent workflows moving rightward and upward. Alternatively, the convention could be that the topmost and rightmost element is executed first, with subsequent workflows moving leftward and downward.

Figure 4:
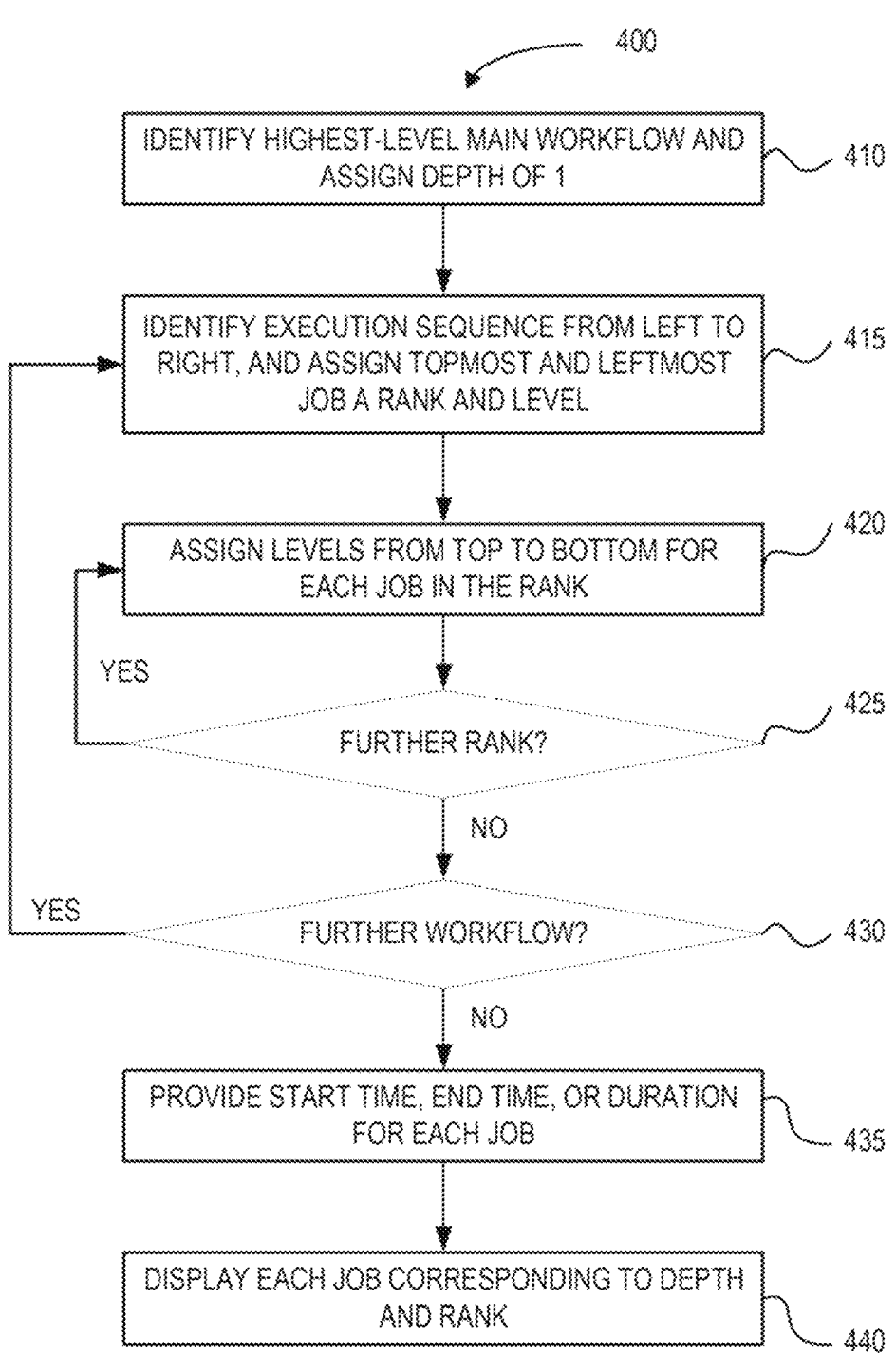
FIG. 4 is a flowchart diagram of an exemplary method for assigning unique identifiers to jobs in the example workflow of FIG. 3 and estimating workflow execution time.

FIG. 4 illustrates the method 400 of assigning unique identifiers to the example workflow 300 of FIG. 3 and estimating the completion time. At step 410 the highest-level main workflow is identified and is assigned a depth of 1. At step 415 the execution sequence for the jobs in the workflow is identified, from left to right, and the topmost and leftmost workflow job is assigned a rank and level in accordance with the naming convention. As previously noted, in some embodiments a different convention can be used, with the appropriate adjustment.

At step 420, each job having the same rank is assigned a distinct level. At step 425, the process shifts to the next rank, if any, which is the next set of jobs that are to the right of the previous set of jobs. Step 420 and step 425 are repeated for every rank of jobs in the current workflow. At step 430, the process shifts to the next workflow, and the depth increases incrementally (e.g., if the current depth is 1, then a depth of 2 is assigned to the subsequent workflow). The process then repeats, starting at step 415 until completed for all depths of workflows and ranks of jobs.

At step 435, a start time, end time, or duration may be provided for each job. This allows for the completion of each workflow job to be estimated, as well as for the whole workflow. At step 440 the workflow is displayed graphically on a display with each workflow job laid out corresponding to depth and rank.

To facilitate visualization, each workflow job may be displayed on a grid with each job having its own row and being identified as a "Task"; each "Task" may have its unique job name displayed in a "Task Name" column; each job may have the unique workflow job identifier displayed in a "Job ID" column; "Tasks" that correspond to a job with dependencies on previous jobs may be linked to prior "Tasks"; and every job and every dependency may be captured in the framework.

Similarly, each workflow job may further include columns for the provision of data relating to the start time of the workflow job, the end time of the job, and the duration of the job. These details allow for the forecasting and execution of the duration of the whole workflow. These details can be updated each time a job is executed to facilitate estimate of execution times in the future. The critical path and the longest path may also be estimated for future workflow executions, using prior executions time of the workflow.

If a workflow job fails and is started at a later time, the start time of the "Task" corresponding to the job can be updated, allowing for an updated completion time to be computed, for both the workflow job and for the overall workflow. If a workflow job is modified, or workflow jobs are added or removed to the workflow, the estimated completion time and duration is recalculated based on the changes made to the workflow.

By implementing the described method and naming convention, the interdependencies are easily maintained throughout the workflow when changes are made. The workflow may also be displayed visually (e.g., FIG. 3) in the framework, and may be exported in multiple document formats (e.g., Microsoft Project™, Excel, PDF, CSV, etc.).

The various systems or processes described enable: visualization of entire workflows in a manner that captures all dependencies and inter-relationships accurately and comprehensively; estimation of completion and duration times of both individual workflow jobs and of workflows as a whole; computation of restart and completion times of workflows in the event of upstream workflow job delays or breaks; critical path analysis to identify the most crucial, rate-determining path, for the execution of workflows; impact and dependency analysis of workflow jobs for any modifications, additions, or deletions; dynamic realignment of workflow structures and reforecasting of workflow start, completion, and duration; documentation of entire workflows in a graphical format; and provision of a user-friendly graphical user interface (GUI).

Various systems or processes have been described to provide examples of embodiments of the claimed subject matter. No such example embodiment described limits any claim and any claim may cover processes or systems that differ from those described. The claims are not limited to systems or processes having all the features of any one system or process described above or to features common to multiple or all the systems or processes described above. It is possible that a system or process described above is not an embodiment of any exclusive right granted by issuance of this patent application. Any subject matter described above and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, reference numerals may be repeated among the figures to indicate corresponding or analogous elements. In addition, numerous specific details are set forth to provide a thorough understanding of the subject matter described herein. However, it will be understood by those of ordinary skill in the art that the subject matter described herein may be practiced without these specific details. In other instances, well-known methods, procedures, and components have not been described in detail so as not to obscure the subject matter described herein.

The terms "coupled" or "coupling" as used herein can have several different meanings depending in the context in which these terms are used. For example, the terms coupled or coupling can have a mechanical, electrical or communicative connotation. For example, as used herein, the terms coupled or coupling can indicate that two elements or devices are directly connected to one another or connected to one another through one or more intermediate elements or devices via an electrical element, electrical signal, or a mechanical element depending on the particular context. Furthermore, the term "operatively coupled" may be used to indicate that an element or device can electrically, optically, or wirelessly send data to another element or device as well as receive data from another element or device.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Terms of degree such as "substantially", "about", and "approximately" as used herein mean a reasonable amount of deviation of the modified term such that the result is not significantly changed. These terms of degree may also be construed as including a deviation of the modified term if this deviation would not negate the meaning of the term it modifies.

Any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the result is not significantly changed.

Some elements herein may be identified by a part number, which is composed of a base number followed by an alphabetical or subscript-numerical suffix (e.g. 112*a*, or 1121). All elements with a common base number may be referred to collectively or generically using the base number without a suffix (e.g. 112).

The systems and methods described herein may be implemented as a combination of hardware or software. In some cases, the systems and methods described herein may be implemented, at least in part, by using one or more computer programs, executing on one or more programmable devices including at least one processing element, and a data storage element (including volatile and non-volatile memory and/or storage elements). These systems may also have at least one input device (e.g. a pushbutton keyboard, mouse, a touchscreen, and the like), and at least one output device (e.g. a display screen, a printer, a wireless radio, and the like) depending on the nature of the device. Further, in some examples, one or more of the systems and methods described herein may be implemented in or as part of a distributed or cloud-based computing system having multiple computing components distributed across a computing network. For example, the distributed or cloud-based computing system may correspond to a private distributed or cloud-based computing cluster that is associated with an organization. Additionally, or alternatively, the distributed or cloud-based computing system be a publicly accessible, distributed or cloud-based computing cluster, such as a computing cluster maintained by Microsoft Azure™, Amazon Web Services™, Google Cloud™, or another third-party provider. In some instances, the distributed computing components of the distributed or cloud-based computing system may be configured to implement one or more parallelized, fault-tolerant distributed computing and analytical processes, such as processes provisioned by an Apache Spark™ distributed, cluster-computing framework or a Databricks™ analytical platform. Further, and in addition to the CPUs described herein, the distributed computing components may also include one or more graphics processing units (GPUs) capable of processing thousands of operations (e.g., vector operations) in a single clock cycle, and additionally, or alternatively, one or more tensor processing units (TPUs) capable of processing hundreds of thousands of operations (e.g., matrix operations) in a single clock cycle.

Some elements that are used to implement at least part of the systems, methods, and devices described herein may be implemented via software that is written in a high-level procedural language such as object-oriented programming language. Accordingly, the program code may be written in any suitable programming language such as Python or Java, for example. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, read-only memory, magnetic disk, optical disc) or a device that is readable by a general or special purpose programmable device. The software program code, when read by the programmable device, configures the programmable device to operate in a new, specific, and predefined manner to perform at least one of the methods described herein.

Furthermore, at least some of the programs associated with the systems and methods described herein may be capable of being distributed in a computer program product including a computer readable medium that bears computer usable instructions for one or more processors. The medium may be provided in various forms, including non-transitory forms such as, but not limited to, one or more diskettes, compact disks, tapes, chips, and magnetic and electronic storage. Alternatively, the medium may be transitory in nature such as, but not limited to, wire-line transmissions, satellite transmissions, internet transmissions (e.g., downloads), media, digital and analog signals, and the like. The computer usable instructions may also be in various formats, including compiled and non-compiled code.

While the above description provides examples of one or more processes or systems, it will be appreciated that other processes or systems may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be revisited.

I claim:

1. A system for estimating workflow execution time in a computing environment, the system comprising:
   one or more servers, each of the servers comprising a server processor configured to execute one or more of a plurality of jobs;
   a monitoring computer, the monitoring computer comprising a processor operatively coupled to a memory and a display, the processor configured to:
   identify the plurality of jobs, wherein each job of the plurality of jobs has a job start time, a job end time and a job duration;
   label the plurality of jobs according to a depth and a rank, wherein for each job, a respective depth identifies a workflow to which the job belongs, and a respective rank identifies sequencing of the job within the workflow to which the job belongs;
   determine an execution time of the plurality of jobs, based on the job duration of each of the plurality of jobs;
   in response to determining that a selected job has been restarted, update a selected job start time of the selected job and redetermine the execution time of the plurality of jobs using the selected job start time, wherein the redetermining is based on a selected rank and a selected depth of the selected job; and
   provide a notification of the execution time once redetermined.

2. The system of claim 1, wherein each job is labelled with a respective level, wherein the level provides an indication of a relative order within the respective rank of the job, and wherein the plurality of jobs is further assigned to rows based on their level.

3. The system of claim 1, wherein a child job has a dependency on a respective parent job, and the child job has a link to the respective parent job, wherein the link comprises a visual indicator of the dependency.

4. The system of claim 1, wherein the rank is denoted by an integer number.

5. The system of claim 4, wherein a job of the plurality of jobs with a respective rank that has a lower number than a second job of the plurality of jobs with a respective rank that has a higher number is executed before the second job of the plurality of jobs.

6. The system of claim 2, wherein the level determines that in a portion of the plurality of jobs, for each job having a same respective rank and having a same prior job but are not interdependent, are to be executed in parallel.

7. The system of claim 1, wherein the depth is denoted by an integer number.

8. The system of claim 7 wherein a second workflow with a respective depth that has a higher number than a first workflow with a respective depth that has a lower number is a sub-workflow of the first workflow.

9. The system of claim 1, wherein the processor is further configured to display each of the plurality of jobs in a corresponding plurality of rows on the display, wherein the plurality of jobs is assigned to rows based on their depth and rank.

10. A method for estimating workflow execution time in a computing environment, the method comprising:

labelling a plurality of jobs according to a depth and a rank, wherein for each job, a respective depth identifies a workflow to which the job belongs, and a respective rank identifies sequencing of the job within the work-flow to which the job belongs;

providing a job start time, a job end time, and a job duration for each of the plurality of jobs;

determining an execution time of the plurality of jobs, based on the job duration of each of the plurality of jobs;

in response to determining that a selected job has been restarted, updating a selected job start time of the selected job and redetermining the execution time of the plurality of jobs using the selected job start time, wherein the redetermining is based on a selected rank and a selected depth of the selected job; and providing a notification of the execution time once rede-termined.

11. The method of claim 10, further comprising, for each job, labelling a respective level of the job, wherein the level provides an indication of a relative order within the respec-tive rank of the job, and wherein the plurality of jobs are further assigned to rows based on their level.

12. The method of claim 10, further comprising:

determining a dependency of a child job on a parent job; and linking the child job to the parent job, wherein the linking comprises displaying a visual indicator of the depen-dency.

13. The method of claim 10, wherein the rank is denoted by an integer number.

14. The method of claim 13, wherein a job of the plurality of jobs with a respective rank that has a lower number than a second job of the plurality of jobs with a respective rank that has a higher number is executed before the second job of the plurality of jobs.

15. The method of claim 11, wherein the level determines that a portion of the plurality of jobs, each job having a same respective rank and that are linked to a same prior job, but are not interdependent are to be executed in parallel.

16. The method of claim 10, wherein the depth is denoted by an integer number.

17. The method of claim 16, wherein a second workflow with a respective depth that has a higher number than a first workflow with a respective depth that has a lower number is a sub-workflow of the first workflow.

18. The method of claim 10, further comprising display-ing each of the plurality of jobs in a corresponding plurality of rows on a display, wherein the plurality of jobs is assigned to rows based on their depth and rank.

19. A non-transitory computer readable medium storing computer executable instructions which, when executed by at least one computer processor, cause the at least one computer processor to carry out a method for estimating workflow execution time in a computing environment, the method comprising:

labelling a plurality of jobs according to a depth and a rank, wherein for each job, a respective depth identifies the workflow to which the job belongs, and a respective rank identifies sequencing of the job within the work-flow to which the job belongs;

providing a job start time, a job end time, and a job duration for each of the plurality of jobs;

determining an execution time of the plurality of jobs, based on the job duration of each of the plurality of jobs;

in response to determining that a selected job has been restarted, updating a selected job start time of the selected job and redetermining the execution time of the plurality of jobs using the selected job start time, wherein the redetermining is based on a selected rank and a selected depth of the selected job; and providing a notification of the execution time once rede-termined.

* * * * *